United States Patent [19] [11] 3,819,161
Hubatsch [45] June 25, 1974

[54] STEEL MILL ARRANGEMENT AND IMPROVED CONVERTER CONSTRUCTION AND HANDLING EQUIPMENT FOR A STEEL MILL

[75] Inventor: Gotthard Hubatsch, Mulheim (Ruhr), Germany

[73] Assignee: Demag Aktiengesellschaft, Aluisburg, Germany

[22] Filed: Oct. 17, 1968

[21] Appl. No.: 798,507

Related U.S. Application Data

[62] Division of Ser. No. 619,711, March 1, 1967, abandoned.

[30] Foreign Application Priority Data
Mar. 2, 1966 Germany.............................. 58613

[52] U.S. Cl. ................................................ 266/13
[51] Int. Cl................................................ C21c 5/00
[58] Field of Search ............ 266/13, 35, 36 P, 36 R, 266/39

[56] References Cited
UNITED STATES PATENTS

| 2,799,492 | 7/1957 | Hobenreich | 266/13 |
| 2,847,206 | 8/1958 | McFeaters | 266/35 |
| 3,005,628 | 10/1961 | Rinesch | 266/35 P |
| 3,093,253 | 6/1963 | McFeaters | 266/13 X |
| 3,149,191 | 9/1964 | McFeaters | 266/35 X |
| 3,215,425 | 11/1965 | Vogt | 266/35 |
| 3,235,243 | 2/1966 | Taylor | 266/39 X |
| 3,257,105 | 6/1966 | Heemeyer | 266/13 |
| 3,347,539 | 10/1967 | Mitchell | 266/35 |
| 3,411,764 | 11/1968 | Falk | 266/13 |
| 3,430,941 | 3/1969 | Lambrecht | 266/36 P |
| 3,434,705 | 3/1969 | Pere | 266/13 |

Primary Examiner—J. Spencer Overholser
Assistant Examiner—John S. Brown
Attorney, Agent, or Firm—McGlew and Tuttle

[57] ABSTRACT

A complete steel mill plant is described in respect to the arrangement of separate overhead crane elements for transporting a converter in respect to a scrap charging stand, a pig mixer, a tapping stand, a blowing stand and a pouring station, etc. In accordance with the invention, the mill plant is provided with three elongated halls disposed side by side, including a scrap and pig movement hall, a converter movement or operations hall and a pouring hall arranged in that order. The scrap and pig movement hall includes an overhead conveyor for conveying scrap material and pig to the scrap charging stand and pig mixer which are accessible from the operations hall. The operations hall includes an overhead crane having two separate vertically movable hook elements which are engageable with a converter in a manner such that the converter may be lifted and tilted about a substantially horizontal axis. For this purpose the converter is especially constructed and includes suspension loops or arms which are pivotally mounted on each side of the converter and they may be held to permit tilting of the converter about an axis defined by a projecting axle on each side of the converter. The tilt axis of the axles extends substantially horizontal through the center of the converter. The upper loop ends of the suspension arms may be engaged by hooks from one of two lifting devices of an overhead crane movable in the operations hall. The converter also carries loops or eyelets adjacent the bottom thereof which may be engaged by the second lifting device from either side of the converter in order to lift the lower end of the converter for the tilting movement of the converter about the horizontal axis defined by the side suspension loops.

2 Claims, 15 Drawing Figures

Inventor
GOTTHARD HUBATSCH

BY
McGlew & Toren
ATTORNEYS

Inventor
GOTTHARD HUBATSCH

BY
McGlew & Toren
ATTORNEYS

Inventor
GOTTHARD HUBATSCH

BY
McGlew & Toren
ATTORNEYS

STEEL MILL ARRANGEMENT AND IMPROVED CONVERTER CONSTRUCTION AND HANDLING EQUIPMENT FOR A STEEL MILL

This is a division of application Ser. No. 619,711 filed Mar. 1, 1967, now abandoned.

A further feature of the converter construction is that it is provided with a projecting lug or pin which may be engaged by fluid pressure operated devices for the purpose of tilting the converter when it is mounted on a stand. For this purpose the suspension arms are squared at their lower ends so that they may be engaged within similar squared stand elements to support the arms so that they cannot move so that the converter may be tilted about its mounting in the suspension arms.

In accordance with a feature of the invention, the central converter movement hall includes at one end a scrap stand which is mounted closely adjacent to a pig mixer to permit the converter to be moved first to the scrap stand for a charge of scrap and then oriented beneath the pig mixer for receiving a charge of pig iron. Further down the converter movement hall there is located a fixed stand for the temporary positioning of a converter and opposite thereto a tapping stand for tapping the converter. The hall includes a further station which includes one or two separate blowing stand elements, each having a movable carriage member which is adapted to receive the converter from the overhead lifting crane and move it into association with the blowing stand of one of the blowing stand stations or they may be located to receive the converter direct from the overhead crane.

A further feature of the invention is that the blowing stand includes a converter hat which is disposed between the blower stack and the converter when positioned on a stand therebeneath. The stand advantageously includes means for raising the converter into association with the hat and for thereafter moving the converter and the hat upwardly toward the blowing stack to orient the blower and the hat in respect to the stack in accordance with the refining operations to be carried out and the amount of air which is to be drawn into the stack around the bat.

In accordance with a still further feature of the invention, the movable stand advantageously includes means for pivoting the converter about its suspension axis which is disposed substantially horizontally and also for raising the converter upwardly in order to vary its position in respect to the converter hat and the blowing stack.

A still further feature is that where the particular process requires it, the stand for mounting the converter below the stack may advantageously comprise a rotatable table to permit rotation of the converter to obtain the outward movement of the bath within the converter to form the surface in the form of a parabola to thus increase the reaction area.

BRIEF SUMMARY OF THE INVENTION

The present invention relates in general to the construction of steel mills and in particular to a new and useful steel mill arrangement and handling apparatus for easily moving the raw scrap material and the converter into association with various operating elements and to an improved converter construction and blower stand arrangement.

The present invention is directed to arrangements and processes for improving the operation of steel mills, particularly in respect to lance blow steel mills.

In the operation of smelting works, it is customary to feed the materials which are needed for carrying out the steel making process to the stationary converter by means of conveyors. This requires track systems which substantially cover the mill floor. The bringing in of scrap and pig must occur successively at intervals of time because the space above the converter can be occupied during any time period by only one conveyor.

The converter stands which are located throughout the modern steel mill provide a center to which all materials must be brought. Due to the long track systems, as well as the crane runways which are necessary because the pig mixes are located somewhat further removed from the refining stands, the operative process in scrap charging, pig charging, blowing, pouring, slagging, and finally relining, is influenced essentially by the fact that safety intervals of time must be maintained between each individual operation. These intervals of time which are necessary for carrying out the movement between one transferring stage and the other are a determining factor in the intervals of time which are necessary between the individual charges in the steel making process.

Some attempts have been made to mount the converter so that it will be wheelable on a heavy chassis, but for such an arrangement it is necessary to provide a sufficiently wide track as well as several drives for the vehicle, such as tipping drives and traveling drives. It is questionable whether the necessary tracks which are required to extend to the various treatment stations can be provided in sufficient quantity in the steel mill hall.

In accordance with the present invention, there is provided a steel mill hall construction and arrangement which advantageously includes a scrap charging hall adjacent one side of an operations or converter movement hall and a pouring hall arranged adjacent the opposite side of the operations hall. The arrangement eliminates the difficulties caused by traffic from several directions and it provides greater elasticity with respect to the arrangement of equipment parts and an increase in speed of the traffic. By arranging all of the operational steps in a row along the operations hall, it is possible to direct the materials through the mill in a flow more economical than was possible heretofore.

In accordance with a feature of the invention, a converter is constructed so that it may be lifted by overhead lifting cranes and easily tilted by engaging the lower portion of the converter with an additional lifting crane so that the converter is pivoted about a supporting horizontal axis. In addition, the converter may be mounted on a fixed or movable platform in a manner such that it may be raised or tilted for pouring or receiving materials in a simple manner. In the preferred arrangement, the scrap movement hall includes an overhead crane for delivering the scrap material and the pig to the necessary stations which will be located so that they will be oriented in the operations hall. An overhead moving crane is available in the operations hall for transferring the converter from one station to the next so that it may be oriented in respect to treatment stations such as scrap and pig charging, blowing, pouring, relining, slagging and the like. The converter is moved from junction points in a manner of rotary traffic. For such a procedure the junction points in the steel mill can be so distributed that an ideal material flow in the sense of optimum economic efficiency can be arranged. With such an arrangement it is not necessary for the converter vessel to be slowed in its movement while it awaits the feeding of various charge materials but it can be moved in a constant flow from the individual stationary dispensing points. With the arrangement of the invention various equipment which was hertofore considered indispensable are now superfluous. For example, a scrap charging crane is no longer needed for scrap charging. A separate pig charging crane also used to be necessary but this, together with slag cross trucks, slag crane, and longitudinal crane in the pouring hole are all eliminated in the arrangement of the invention.

In the preferred arrangement, the converter is transferred along the operations hall by a traveling overhead crane which includes two sets of lifting hooks, one for engaging suspension arms or slings which are pivoted on lugs or axles which are horizontally disposed on each side of the conveyor, and another lifting hook for engaging a loop or connecting part of the converter located below the pivotal suspension. In this manner the converter may be lifted, transferred or tilted, as desired. The operations crane, together with the converter, may be moved along the complete length of the operations hall and the converter may be oriented, in turn, adjacent a scrap charging stand to receive scrap and adjacent a pig mixer for a charge of pig both, for example, being located on one side of the operations stand. Thereafter the converter may be moved, for example, to a location to permit it to be oriented for pouring into means such as transportable ladles which are located in the pouring hall but accessible from the operations hall. The converter is then moved to the opposite side for orientation in a blowing stand. The arrangement advantageously includes a wheeled stand or carriage for receiving the converter which may be moved to one side of the operations hall so that it may be oriented below the blowing stack or tilted on the stand for pouring into ladles or other devices. The mounting stand advantageously includes means for raising the converter in respect to the blowing stand or for tilting the converter as desired. The arrangement is such that every operational location is within easy reach of the converter and its moving equipment. By this fixed arrangement of all the charging locations the machine costs decrease accordingly and it is even possible to build the halls to lower heights with favorable effects on the requirements for the hall framework, smoke bay and similar structures. The arrangement for moving the converter also permits utilization of the total vessel height with respect to the converter mouth and the position of the tap. The converter construction is such that the supporting arms arranged on each side of the horizontal pivot lug axis permits engagement of the arms for lifting purposes or mounting of the arms with the conveyor so that the conveyor may be pivoted about the lug axes. The converter may thus be oriented in respect to either the lifting cranes or fixed stands so that it may be easily pivoted or tipped and it may be exactly guided in respect to its tipping movement by means of projecting lugs which are engageable by hydraulic tipping elements.

A further feature of the arrangement of the equipment includes a novel blowing stand construction wherein a converter hat is disposed between the blower stack and a converter which is positioned therebelow. The converter may be raised up to engage beneath the hat so as to be positioned directly below the stack and may be moved up further to close the gap between the hat and the stack as desired. A further modification provides for the rotatable support of the converter below the blower stack so that the converter may be rotated during the blowing operation. A converter constructed in accordance with the invention permits exact guiding during lifting and tipping using a minimum of associated equipment.

The converter hat attachment below the blower defines a narrow nozzle-like passage between the converter and the blower for facilitating the increased velocity flow for the exhaust of gases through the area of the converter hat. The large opening of the hat catches the ejection which falls back from the converter stack so that the converter mouth is protected and so that there is no likelihood that "blowing monkeys" will form during the operation at the edge of the converter mouth. In this manner the converter is not loaded by a moment of the "monkeys" which weigh many tons and which may conteract the tipping drive. The construction insures a favorable process method and also a falling back of the blow ejection into the melting zone of the vessel to result in higher yields. The hat attachment materially improves the flow conditions of the exhaust gas flow in the refining process. The hat is mounted on supporting arms which can be raised and lowered by hydraulic devices. By shifting the position of the hat in relation to the blowing stack, the carbon monoxide rich exhaust gases may be diluted with sufficient atmospheric oxygen to control the after combustion and temperature rise in the stack. This is accomplished by varying the gap between the converter hat and the stack in order to control the amount of air which is admitted into the stack at such a location. In some instances the converter and the converter hat may be sealed in respect to the stack and inert gas veils may be used for the sealing.

Accordingly, it is an object of the invention to provide an improved steel mill construction and arrangement for facilitating the movement of a converter in respect to various operational stands.

A further object of the invention is to provide a method of making steel using a movable converter which is arranged for movement along a hall past a scrap charging stand, a pig mixer, a pouring station, a blowing stand, comprising arranging the stations along an elongated hall in a manner such that they can be supplied from outside the hall, and moving the converter in succession from one stage to the other as necessary to the final blowing stand.

A further object of the invention is to provide an apparatus for refining steel which includes a combination of lifting apparatus and a converter having arms on each side for supporting the converter for pivotal movement about a substantially centrally located horizontal tilting axis, and including engageable means below the tilting axis when the supporting arms are lifted for tilting the converter as necessary.

A further object of the invention is to provide an improved steel mill layout in which the various steel mill charging and pouring stations are located along an elongated hall through which the converter is movable by means of an overhead lifting device, the arrangement being such that the charging stations may be charged from outside the hall and oriented to discharge their content into the converter which is moved from station to station.

A further object of the invention is to provide an improved converter construction, blower stack construction and converter hat construction and an improved apparatus for mounting the converter in respect to a blowing stand.

A further object of the invention is to provide a plant for the production of steel and improved converter and associated equipment construction which are simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION

Figure 1:
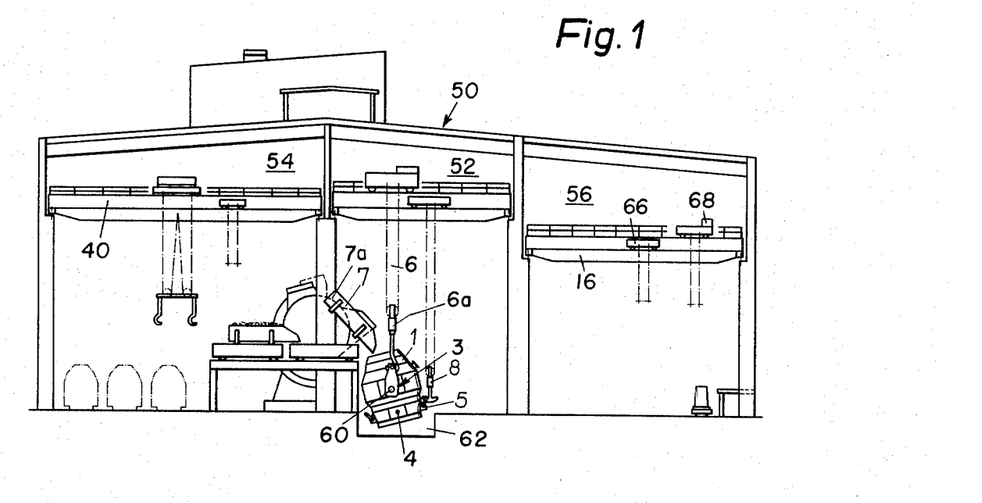
FIG. 1 is a transverse sectional view of a steel mill hall in the vicinity of a scrap charging station taken along the lines 1—1 of FIG. 4 and constructed in accordance with the invention.
Figure 2:
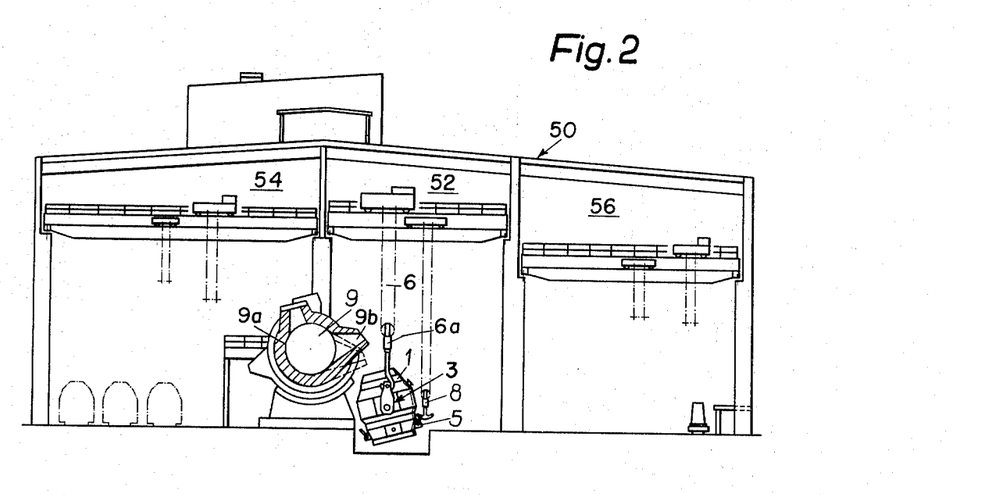
FIG. 2 is a section taken along the line 2-2 of FIG. 4 at a location adjacent the pig mixing and charging station.
Figure 3:
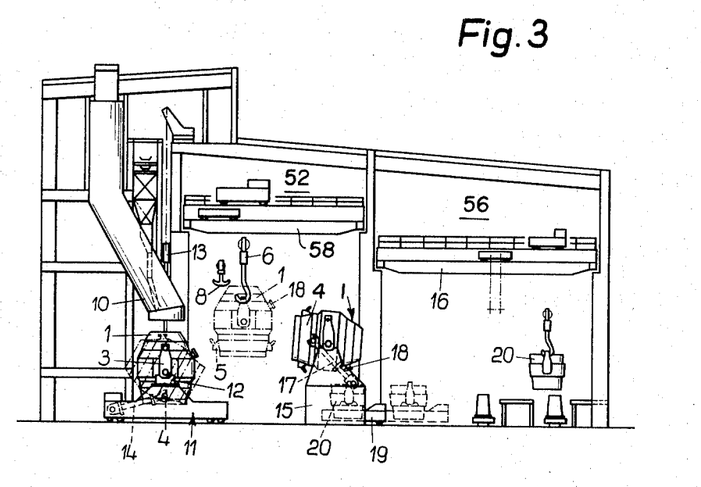
FIG. 3 is a view similar to FIG. 1 indicating a cross sectional view along the line 3—3 of FIG. 4 in the vicinity of the blowing stand.
Figure 4:
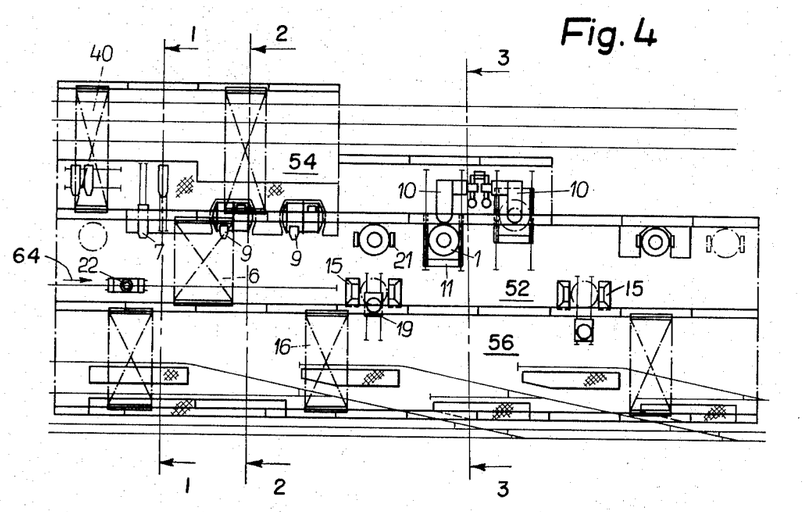
FIG. 4 is a partial top plan view of the equipment layout in the steel mill halls.

Referring to the drawings in particular, the invention embodied therein as indicated in FIGS. 1 - 7 comprises a steel mill generally designated 50 which includes a central longitudinally elongated converter movement hall or operations hall 52 which is arranged centrally between a scrap material handling hall 54 and a pouring hall 56. As best indicated in FIG. 4, the scrap material handling hall 54 is of a length such that it connects to one end of the operations hall 52 at a location to permit the scrap material and the pig material to be delivered into association with a scrap charging device or station 7 and a pig mixer 9 alongside the operations hall by means of overhead crane lifting devices generally designated 40. In accordance with the invention, a converter generally designated 1 is constructed so as to be manipulated by means of lifting elements or lifting devices or lifting cranes 6 and 8 carried on a longitudinally movable crane member 58 so that the converter may be oriented successively in association with each process station extending along the operations hall 52. The converter 1 is an unsupported converter. The term "unsupported converter" refers to a converter which is capable of being used for actually making the steel product but which does not have fixed supporting equipment attached thereto or a fixed mounting base with tilting gearing connected thereto so that it can be transported by itself throughout the operations hall. As seen in FIG. 1, the converter 1 includes suspension arm means generally designated 3 which comprises arm members or loops which extend upwardly from horizontal axles or lug members 60 for pivotally supporting the converter for tilting movement about the horizontal tilting axis of these lug members 60. To facilitate the tilting of the converter 1, the lifting equipment includes a double hook member of the lifting device 8 which may be engaged in an eyelet or lifting connection 5 adjacent the bottom on each side of the converter. The lower end of the converter below the tilting axis may be raised upwardly relative to the tilting axis by engaging the connection 5 with the lifting device 8 to tilt the converter about the lugs 60.

In the first stage of operation, the converter 1 is oriented adjacent the scrap charging stand 7 as indicated in FIG. 1, and a lifting device 6 which includes a hook block or lifting crane 6a and the lifting device 8 are manipulated to tilt the converter slightly to receive a charge of material through an inclined chute or charging trough 7a. In the embodiment illustrated, the operations hall is provided with a recessed portion 62 to facilitate the easy orientation of the converter 1 below the trough 7a.

The converter 1 is then moved by the lifting equipment in the direction of the arrow 64 (FIG. 4) into association with one of two pig mixers 9, 9 as indicated in FIGS. 2 and 4. The pig mixers 9 include a rotary vessel 9a which is mounted so that it may be tilted about its central axis to orient a pouring spout 9b in the dotted line position indicated for the pouring of pig into the converter 1.

After the pig charging operation indicated in FIG. 2, the converter 1 is advantageously directed to a movable carriage 11 which is arranged for transverse movement in the hall 52 into and out of association with a respective one of two blowing stands 10, 10. The converter 1 is mounted on the stands and the stands are positioned into association with the blowing stand 10 for the performance of the refining process. For this purpose, the carriage 11 includes two upstanding mounting members 12 which define a conforming recess for receiving and securely holding the lower end 3a of the supporting arms 3 of the converter 1 in a manner such that the arms 3 are held substantially vertically upright permitting the converter to be pivoted about the horizontal axis of the lugs 60, the arms 3 being constrained against pivotal rotation by the support 12. In the position of the carriage 11 below the blowing stand 10, as indicated in FIG. 3, the mouth of the converter 1 is located below a lance 13 for supplying the refining medium. Fluid pressure operated moving means 14 are advantageously provided on the carriage 11 for the purpose of tilting the converter 1 about its horizontal lug axis 60. After completion of the refining process, the converter 1 is rotated for sampling by about 45° by means of the fluid operated moving means 14 which includes a piston rod member having an end which engages a lug or projection 4 defined on each side of the converter 1 immediately below and in alignment with the lug 60.

The carriage 11 is then moved outwardly away from the blowing stand into a position in which it can again be engaged by the lifting devices 6 and 8. It would of course be possible to transfer the converter 1 directly to a fixed stand located below the blower if so desired. In order to empty the converter 1, the lifting device 6 is moved in a longitudinal direction along the operations hall 52 to position the converter in association with one or two tapping stands 15, 15 (FIGS. 3 and 4). The tapping stand 15 is located so that it is accessible using the lifting devices 6 and 8. The pouring hall 56 includes a longitudinally movable pouring crane 16 which carries one or more lifting elements 66 and 68 for the purpose of transferring a ladle 20 to an operative pouring station in a position to receive material from the converter 1 (see FIG. 3). The crude steel is directed out through a tap hole 18 into the ladle 20. Each tapping stand includes hydraulically operated tilting mechanisms 17 which are engageable with lugs 4 for tilting the converter 1 to cause it to pour into a ladle 20 positioned therebeneath. For this purpose the ladles 20 are positioned on a carriage 19 which may be subsequently moved away into the pouring hole for the pouring of the charge.

After the converter 1 is righted by means of the crane 6, the residual slag of the converter 1 is discharged into the carriage or station 22 which is located adjacent the scrap charging station 7, as indicated in FIG. 4. At this station 22 the auxiliary lift 8 of the crane engages the eyelet 5 and rotates the converter 1 about its horizontal axis until the slag is discharged. Direct slagging in the tapping stand is also possible. After this the converter 1 is again run to the scrap charging stand and charged anew. It is then moved to the pig mixer 9 for charging pig. After the charging operation, the charge converter 1 is set down by the lifting devices 6 and 8 on the stand 21 as shown in FIG. 4. After completion of the refining process of the converter which is already standing on the blowing stand 10, the converter with the refined steel is set down on the tapping stand 15 and the charged converter is set on the blowing stand 10 for refining.

The production rhythm can be maintained very well as the time for refining, slagging, etc., is about 20 minutes, and the time for tapping, slagging and charging is also about 20 minutes. A synchronization with sufficient leeway is thus given. By proper arrangements of the installations and use of two production cranes, including the lifting apparatus 6 and 8, all production processes can be carried out by the crane so that additional equipment for tipping of the converter and for tapping the converter may be dispensed with. In comparison to the steel mill indicated in FIG. 4, a conventional installation would have to be equipped with four complete converter stands. With the method and arrangement of the invention only two blowing stands are required for optimal operations. The advantages of the invention reside not only in the saving of installation equipment but also in a particular and simplified operating process by division of the operations. The consequence is a saving in investment and repair cost as well as reduced labor cost and comparable output.

Figure 5:
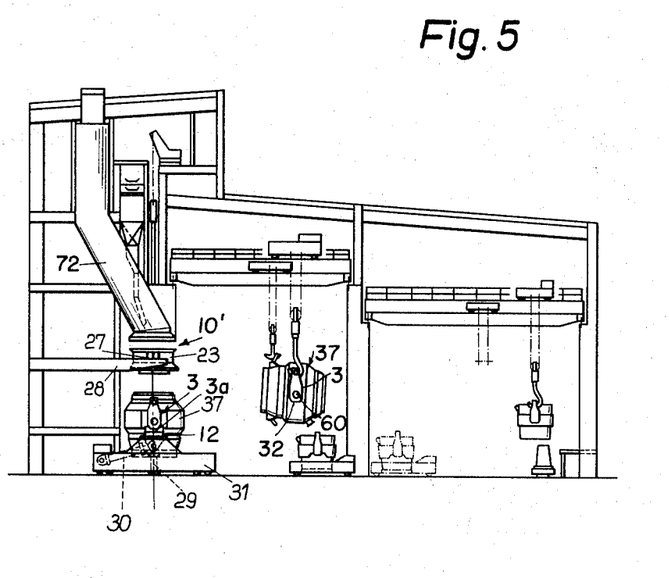
FIG. 5 is a view similar to FIG. 3 but indicating a blower stand with a converter hat.
Figure 6:
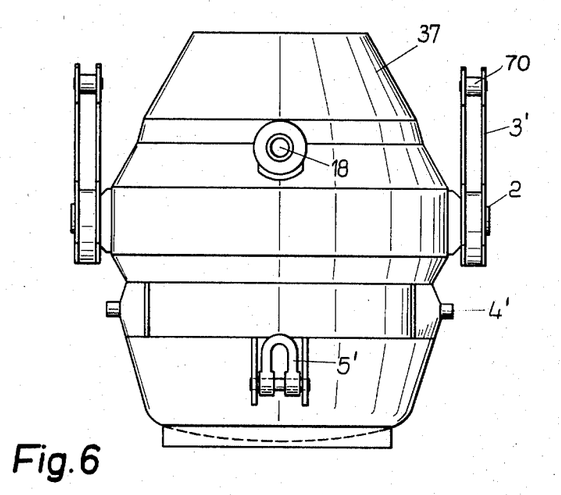
FIG. 6 is a front elevational view of a converter constructed in accordance with the invention.
Figure 7:
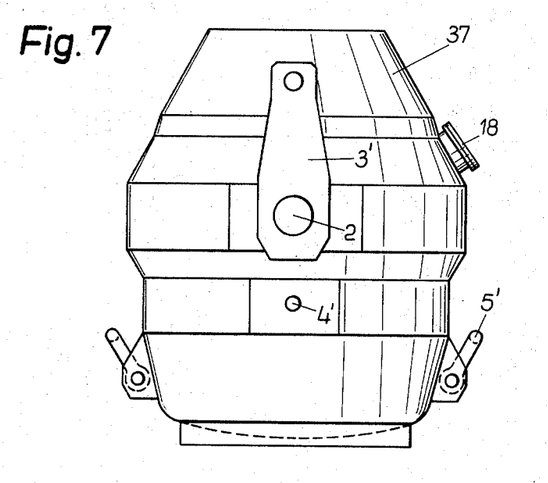
FIG. 7 is a side elevational view of the converter indicated in FIG. 6.

As indicated in FIG. 5, a converter vessel 37 which is shown in detail in FIGS. 6 to 9 is provided with suspension loops or supporting arms 3' as in the other embodiment which rotate about supporting axles or lugs 2 which define a horizontal axis of tilt for the converter. The suspension loops 3' include cross bar members 70 around which the hooks of lifting crane equipment may engage. The projecting pins or journal elements 4' are located at the center of gravity level to permit easy tipping of the converter 37. The converters include eyelets 5' to permit them to be easily lifted.

In the arrangement indicated in FIG. 5, the blowing stand generally designated 10' includes a converter lift or hat 23 which is mounted on arms 28 which may be shifted upwardly relative to a stack 72. The converter hat 23 is provided for a better control of the exhaust gases and of the injection during the refining stage. In present practice using a stationary converter between the converter mouth and the stack entrance, there is an air gap which is set according to the air factor for the requirements of additional air for the complete combustion of the exhaust gases and this gap cannot be varied. The disadvantages are high quantities of exhaust gas due to the use of unnecessary additional air and an ejection which worsens the yield and the safety of operation. In addition, there occurs an unfavorably high air proportion and correspondingly undesirable high temperature in the converter stack 72. By using the hat 23, an admission of air which is variable in accordance with the supply of exhaust gas is possible and in addition the arrangement can be such that complete sealing may be effected. For sealing there are provided at the converter hat 23 packing rings 24 (FIGS. 8 and 9) of a steel which are caused to apply against packing rings 25 of electrolytic copper or other suitable alloy when the converter 37 is lifted upwardly to engage the converter hat 23.

Figure 8:
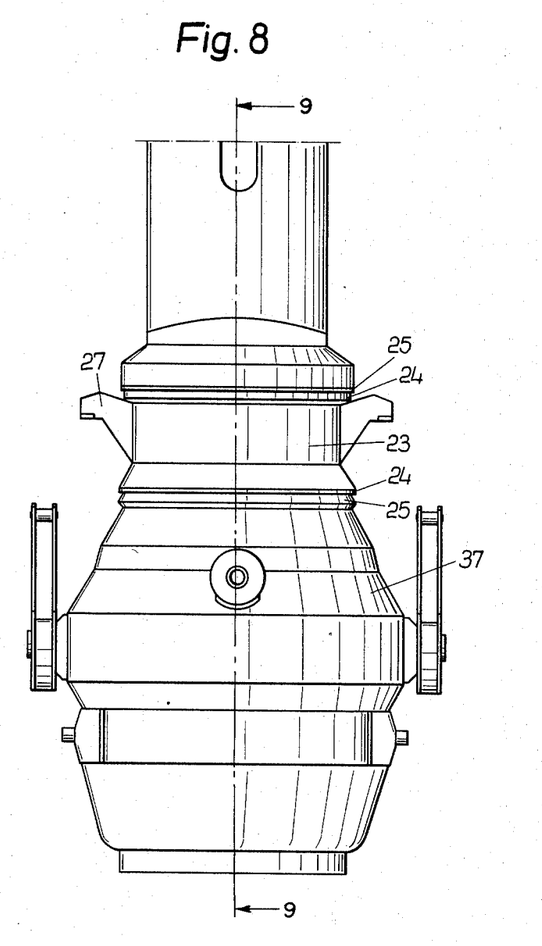
FIG. 8 is an enlarged partial elevational view indicating a converter with a converter hat arranged in a blowing station.
Figure 9:
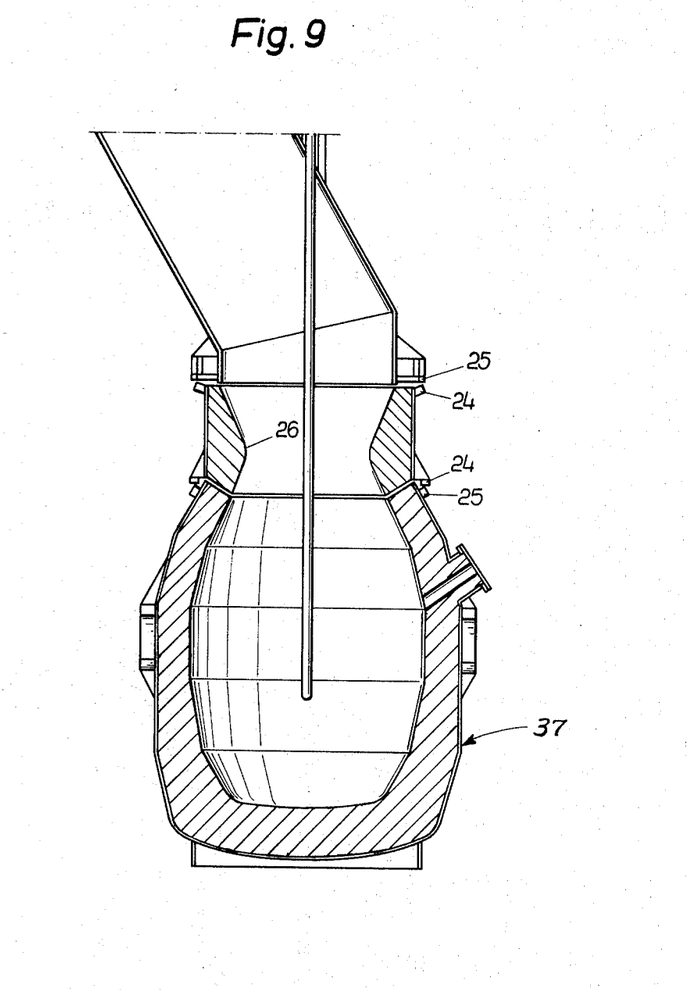
FIG. 9 is a section taken on the line 9-9 of FIG. 8.
Figure 10:
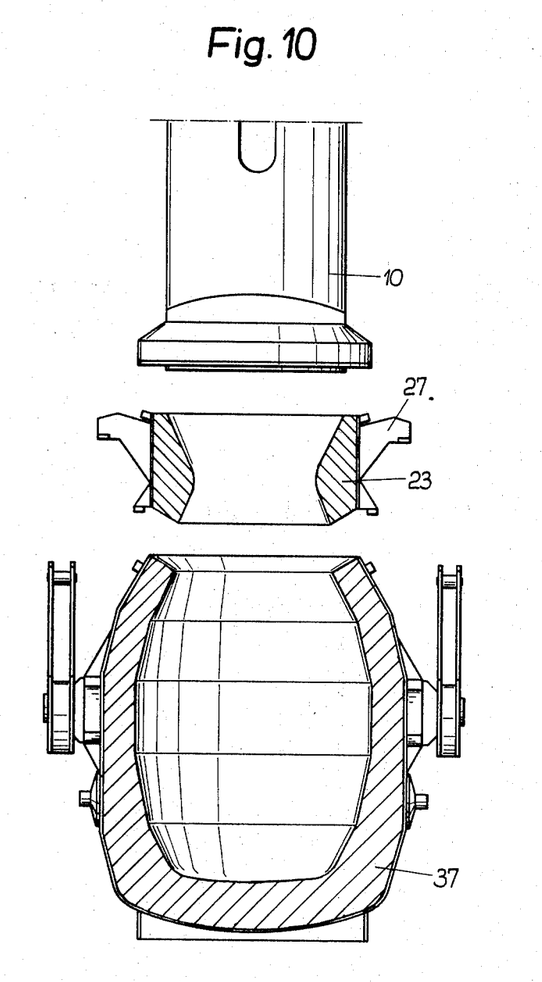
FIG. 10 is a partial sectional and partial elevational view of the converter preliminary to being positioned in association with the converter hat and stack.
Figure 11:
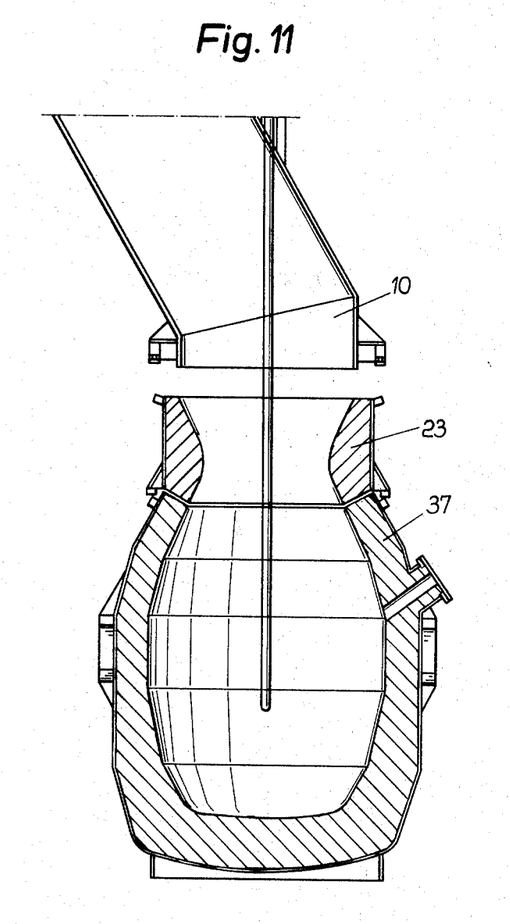
FIG. 11 is a view similar to FIG. 10 with the converter in position connected to the converter hat.
Figure 12:
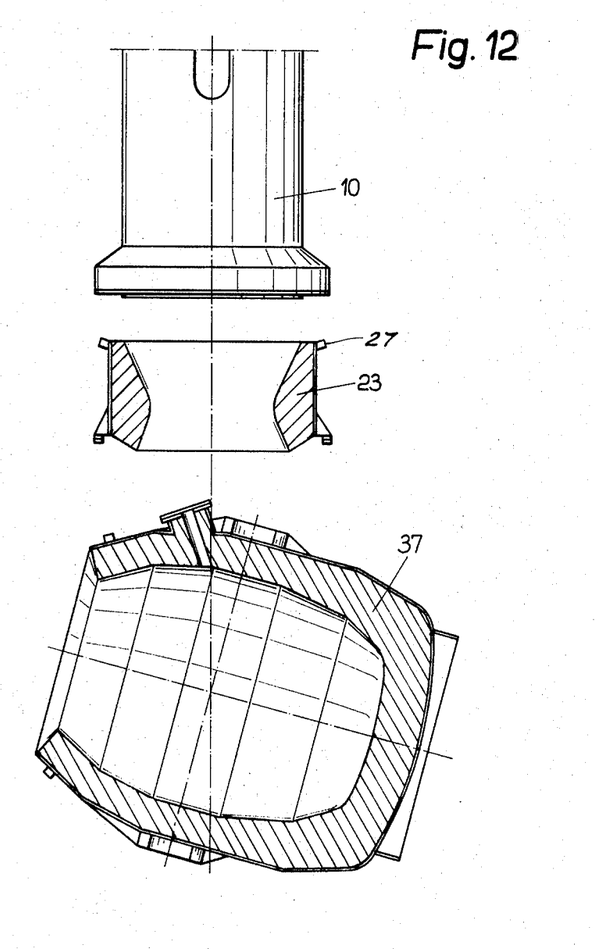
FIG. 12 is a partial section and elevational view of the converter, converter hat and stack indicating the manner in which the converter may be tilted relatively to the converter hat and stack.

As indicated in FIG. 9, the converter hat is lined with refractory blocks or tamping compositions so that a good exhaust gas conduction through a nozzle type constriction 26 of the cross section is insured. In its neutral position, the converter hat 23 remains resting on the two supporting arms 27 below the stack opening as shown in FIG. 5. Converter hat 23 is oriented on the converter vessel as indicated in FIG. 11 and it is brought into its mouth 28 by means of the converter carriage which moves the converter 37 with the hat upwardly. During the remainder of the process, the converter hat 23 remains on its mounting arms 28 and is replaced only for lining with refractory blocks or for tamping. The converter vessel 37 is lifted to the proper level by hydraulic cylinders 29 carried on a carriage 31. The carriage also carries hydraulically operated moving means 30 for tilting the converter 37 as desired. The desired air supply is adjusted by raising or lowering the converter vessel 37 to vary the distance between the converter hat 23 and the stack 72. If there is to be no combustion, the air gap between the stack 72 and the converter hat 23 is closed, as shown in FIG. 8 and 9. For sampling the converter 37 is lowered into its starting position as indicated in FIG. 10 and brought up into a proper position by means of the fluid pressure operated moving means 30 by tilting about its horizontal tilting axis as indicated in FIG. 12. During this tilting, the converter hat 23 remains on its mounting 28. After refining the converter 37 with the carriage 31, is run into the approach zone of the crane for tapping.

Figure 13:
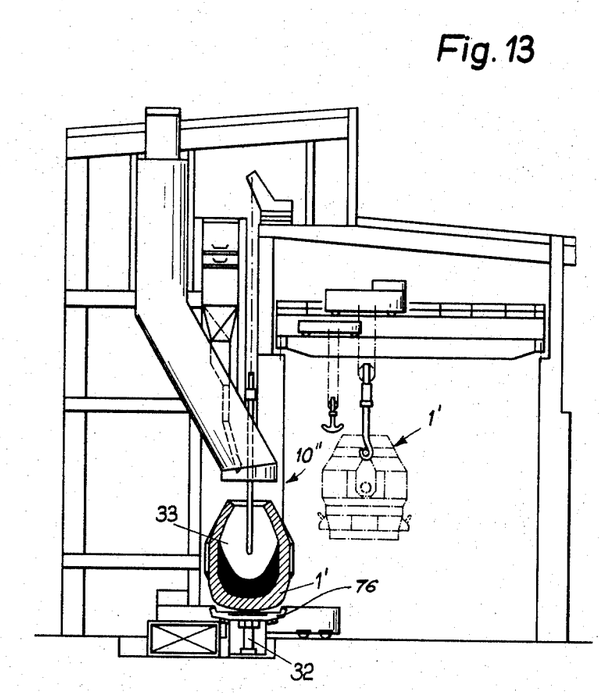
FIG. 13 is a view similar to FIG. 5 of another embodiment of the invention.
Figure 14:
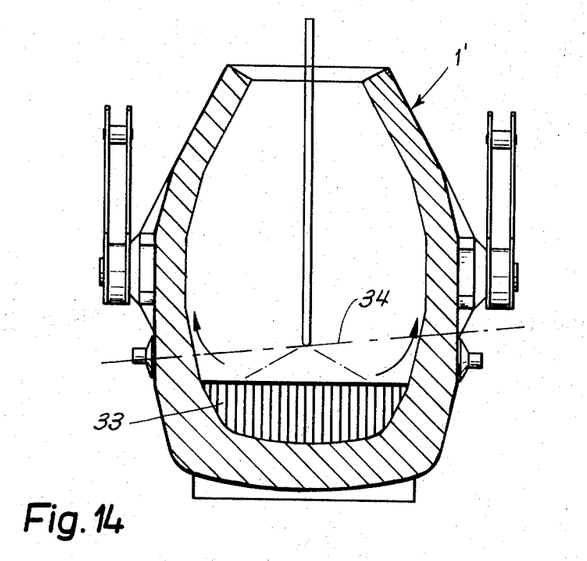
FIG. 14 is an enlarged sectional view of the converter indicated in FIG. 13 prior to its rotation.
Figure 15:
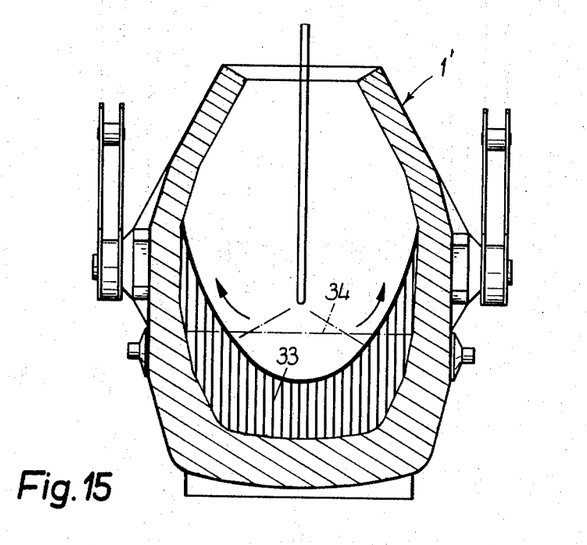
FIG. 15 is a view similar to FIG. 14 indicating the effect of the rotation on the bath material.

In the embodiments illustrated in FIGS. 13 to 15, the blowing stand 10'' includes a rotary mount 32 for rotatably supporting a turntable 76 which is large enough to receive the converter 1' and hold it for rotation beneath a blowing stack 78. During the refining process the converter vessel 1' is rotated about its longitudinal axis by means of the turntable 36 at a speed of about 30 to 50 revolutions per minute or more. The bath 33 which is indicated in a stationary position of the vessel in FIG. 14 will be moved outwardly by the centrifugal force and take the form indicated in FIG. 15 in which its surface is parabolically curved. By changing the speed of rotation or the change of direction of the rotation, greater reactivity of the slag during the refining process may be obtained. In addition, by rotating the vessel in a vertical position, a much higher degree of utilization of the converter volume can be obtained. For example, as indicated in FIG. 15, more pig can be filled into the vessel from that indicated in FIG. 14 up to the line designated 34 in FIG. 15, for example.

The use of transportable converters 1, 1' or 37 makes it possible to design the vessels symmetrically so that the conditions for satisfactory tilting of the converter vessel are provided.

While specific embodiments of the invention have been shown and described in detail to illustrate the application of the inventive principles, it will be understood that the invention may be embodied otherwise without departing from such principles.

What is claimed is:

1. A steel mill plant comprising means defining an elongated operations hall having scrap charging means, pig mixing means, and a blowing stand arranged along said hall, overhead lifting crane means movable along said hall into association with said scrap charging means, said pig mixing means, and said blowing means; a converter having arm means for pivotally supporting said converter for pivotal movement about a substantially centrally located horizontal tilting axis on said converter, engageable means on said converter below said tilting axis, said overhead crane means including a crane member engageable with said arm means for suspending said converter and for transporting said converter along said operations hall and including means engageable with said engageable means on said converter to raise the portion of the vessel below said horizontal tilting axis to tilt the vessel as necessary for supporting said vessel in a proper orientation in association with each of said scrap charging means, said pig feeding means, and said blowing stand and for tapping said converter, said blowing stand including a blowing stack, an annular member comprising a connecting hat, means mounting said annular member for vertical movement below said blowing stack, and means for positioning said converter below said hat in a position to be raised upwardly to engage said hat and to move said hat toward and away from said blowing stack for regulating the air space between said blowing stack and said hat, said connecting hat having a nozzle throat section for increasing the flow of exhaust gases therethrough.

2. A steel mill plant in which the converters for making the steel are moved into association with the various operational and charging equipment, comprising means defining an elongated operations hall having scrap charging means, pig mixing means, and blowing means arranged along said hall, overhead lifting crane means movable along said hall into association with said scrap charging means, said pig mixing means, and said blowing means; and an unsupported converter for producing the steel and capable of being moved through said hall and having arm means for pivotally supporting said converter for pivotal movement about a substantially centrally located horizontal tilting axis on said converter, engageable means on said converter below said tilting axis, said overhead crane means including a crane member engageable with said arm means for suspending said converter and for transporting said converter along said operations hall and including means engageable with said engageable means on said converter to raise the portion of the vessel below said horizontal tilting axis to tilt the vessel as necessary for supporting said vessel in a proper orientation in association with each of said scrap charging means, said pig feeding means and said blowing stand, and for tapping said converter, said blowing means including a blowing stack, an annular member comprising a connecting hat, means mounting said annular member for vertical movement below said blowing stack, and means for positioning said converter below said hat in a position to be raised upwardly to engage said hat and to move said hat toward and away from said blowing stack for regulating the air space between said blowing stack and said hat.

* * * * *